United States Patent
Haimer

(10) Patent No.: US 8,309,895 B2
(45) Date of Patent: Nov. 13, 2012

(54) DEVICE FOR CLAMPING AND UNCLAMPING A TOOL THROUGH INDUCTIVE WARMING OF A TOOL HOLDER

(75) Inventor: Franz Haimer, Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 729 days.

(21) Appl. No.: 12/398,455

(22) Filed: Mar. 5, 2009

(65) Prior Publication Data
US 2010/0225074 A1    Sep. 9, 2010

(51) Int. Cl.
*H05B 6/10* (2006.01)

(52) U.S. Cl. .................. 219/635; 219/637; 219/643

(58) Field of Classification Search .......... 219/607, 219/632, 635, 637, 642, 643, 644, 676; 279/102, 279/147
See application file for complete search history.

(56) References Cited

U.S. PATENT DOCUMENTS

| | | |
|---|---|---|
| 2001/0054471 A1 | 12/2001 | Kelch |
| 2004/0149738 A1 | 8/2004 | Haimer |
| 2004/0160020 A1 | 8/2004 | Irion et al. |
| 2006/0163245 A1* | 7/2006 | Pfau ............................ 219/635 |
| 2008/0277386 A1 | 11/2008 | Haimer |

FOREIGN PATENT DOCUMENTS

| | | |
|---|---|---|
| DE | 19915412 | 10/2000 |
| DE | 10102710 | 9/2002 |
| DE | 20215524 | 1/2003 |
| DE | 10348880 | 5/2005 |
| DE | 102005014984 | 10/2006 |
| DE | 102006015880 | 8/2007 |
| DE | 102006016103 | 10/2007 |
| EP | 1750485 | 2/2007 |
| FR | 2909021 | 5/2008 |

* cited by examiner

*Primary Examiner* — Henry Yuen
*Assistant Examiner* — Hung D Nguyen
(74) *Attorney, Agent, or Firm* — Prince Heneveld LLP

(57) ABSTRACT

A device for clamping and unclamping of tools comprising a tool shaft, by which device a sleeve section (2) of a tool holder (1) comprising a centric receiver opening (4) for a shaft (5) of a rotation tool is inductively heated, which sleeve section retains the shaft (5) of the tool seated in the receiver opening (4) in a press fit, and releases it upon heat up, which device comprises an induction coil assembly with at least one induction coil (6), which can be fed by an electric current for heating the sleeve section (2), and which comprises a concentrator body (11), which is magnetically conductive and electrically nonconductive or substantially electrically nonconductive, which concentrates the magnetic flux of the induction coil (6) onto the portion of the tool side end of the sleeve section (2), wherein the concentrator body (11) supports an induction attachment (14) made of electrically conductive material.

15 Claims, 2 Drawing Sheets

DEVICE FOR CLAMPING AND UNCLAMPING A TOOL THROUGH INDUCTIVE WARMING OF A TOOL HOLDER

FIELD OF THE INVENTION

The invention relates to a device for inductive heating of the sleeve section of a tool holder.

BACKGROUND OF THE INVENTION

In particular for tools rotating at high speed, like, e.g., cutters or drills, it is known to shrink their shafts into a sleeve section of a tool holder. The sleeve section is heated for this purpose by an induction coil surrounding it, so that the tool shaft can be inserted into the receiver opening of the sleeve section, which expands or enlarges under heat influence. The outer diameter of the tool shaft is slightly larger than the nominal diameter of the receiver opening, so that the tool is held torque proof in the press fit of the tool holder after the cooling of the sleeve section.

An inductive heating device suitable for this purpose is, e.g., the heating device known from DE 101 02 710 A1. This device comprises an induction coil, which can be placed over the sleeve section of the tool holder, and which thus encloses the tool holder at a radial distance in an annular manner, which induction coil is fed by AC power. The magnetic field of the induction coil induces inductive currents in the electrically conductive, mostly also magnetizable material of the tool holder, which induction currents directly heat the sleeve section. The induction coil extends axially at least over the engagement length, by which the tool shaft reaches into the receiver opening and its winding terminates in the portion of the tool side face of the sleeve section axially with the sleeve section. In a radial direction, the inner circumference of the induction coil extends at a distance from the sleeve section in order to be able to use the same induction coil in tool holders with a different outer diameter of the sleeve section.

At its face sides and at its outer circumference, the winding of the induction coil is enveloped by a flux concentration assembly made of a magnetizable (ferromagnetic or ferrimagnetic material), whose high magnetic conductivity compared to air concentrates the magnetic flux substantially to this envelope. The magnetizable material of the flux concentrator assembly is electrically nonconductive in order to prevent that the flux concentrator envelope heats also up inductively. The portion of the flux concentration envelope adjacent to the tool side end of the sleeve section is configured as a substantially annular concentrator body, which directly contacts the tool side face of the sleeve section in axial direction. It is the purpose of such a concentrator body to induct the field into the sleeve section in a controlled manner, in order to let it become effective therein and to prevent at the same time that the tool shaft protruding from the sleeve section is inductively heated by the scattered field portion, which would also cause the tool shaft to expand, which is undesirable. Advantageously, such a concentration body is provided as a shielding collar, approximately as described in DE 101 02 710 A1. The shielding collar captures a substantial portion of the field lines, which have initially exited into the exterior space. Thus, it effectively prevents that the outward protruding tool shaft gets heated up.

Nevertheless, even in such an assembly, a measurable scatter field exists in the exterior of the induction coil or of the entire device. However, this scatter field may not influence the primary function of shrinking in and shrinking out in the major portion of the applications.

Recently, people not closely involved with the matter have become more interested in electric "scatter fields".

SUMMARY OF THE INVENTION

It is an object of the invention to further reduce the field on the outside of the inductive coil or on the outside of the device.

According to an aspect of the present invention, a concentrator body indirectly or directly carries an induction attachment made of electrically conductive and, preferably, magnetically nonconductive, material. In this induction attachment, a magnetic field is generated, which overlays the field of the induction coil extending in the exterior of the induction coil or of the device, and thus partially weakening it. This way, an active (typically additional) magnetic shielding is accomplished, compared to the shielding which is accomplished by pole shoes and similar items, which are made of materials which are electrically nonconductive and magnetically conductive, like, e.g., ferrites, which can therefore be designated as "passive shielding".

According to another aspect of the present invention, the induction attachment is fluxed by a portion of the field partially extending outside of the concentrator body, so that a current is induced in the induction attachment itself. Simply speaking, thus the field to be reduced in the exterior of the coil automatically generates an opposite field emanating from the induction attachment and weakening the first field.

According to a further aspect of the present invention, the induction attachment is typically provided as a ring, which is closed in circumferential direction. This way, it assures an optimum shielding, since the field lines of the high frequency field are then also really captured in their entirety and they cannot escape the effect according to the invention of the induction attachment.

An embodiment of the induction attachment can be made from copper. Insofar, it has become apparent that in particular in the method according to the invention, all other materials which appear equivalent at first glance (like e.g. aluminum) develop a significantly inferior effect.

According to another aspect of the present invention, the induction attachment is configured so that it comprises the cross section of an overlay ring. The induction attachment thus extends from the concentrator body in radial direction beyond the concentrator and extends from the concentrator body with a slight inclination (e.g., between 10° and 20° upward) relative to horizontal, when the concentrator body is mounted as intended and aligned horizontally. This way, it forms a substantial portion of the field lines, which otherwise have the tendency to initially circumvent the concentrator body, which is a type of obstacle which is effectively flowed by these field lines. The field lines are thus used very effectively in order to generate Eddy currents and thus generating a respective opposite field in the induction attachment.

According to a further aspect of the present invention, the concentrator body can be inserted in a retaining ring on its outside. The retaining ring is used for positioning the concentrator body relative to the magnetic coil assembly. Thus, the retaining ring simultaneously also holds the induction attachment in position relative to the concentrator body, (e.g., in a position in which the concentrator body and the induction attachment are in direct surface contact with one another). Thus, a substantial amount of heat from the induction attachment can quickly flow into the concentrator body. Through such a configuration, furthermore, the handling is also simplified, since the concentrator body and the induction attachment fitting thereto are permanently connected with one another, and can be jointly replaced by a respective unit made of another concentrator body and another induction attachment fitting thereto, without the user having to consider which induction attachment has to be associated with which concentrator body. Furthermore, when the concentrator body and the induction attachment are in direct surface contact with one another, a very effective magnetic interaction between the concentrator body and the induction attachment is assured, thus a continuously shielded portion.

According to another aspect of the present invention, the retaining ring can be configured as a plastic ring. A plastic ring is the simplest means to take into consideration that there are relative movements between the concentrator body and the induction attachment due to thermal expansion, which is almost unavoidable, since the induction attachment, different from the concentrator body, is heated up directly by the Eddy currents generated therein.

The retaining ring, however, can also be configured as a ceramic ring. This applies when the ceramic ring encloses the concentrator body and the induction attachment with some clearance, so that the ceramic ring cannot be broken through the thermal expansion of the induction attachment or of the concentrator body. In view of this fact, retaining rings made of ceramic, however, lead to manufacturing and tolerance problems much more likely than the retaining rings made of plastic.

When the retaining ring is a plastic ring, the entire unit comprised of the induction attachment, the concentrator body and the plastic ring is ideally fabricated by inserting the concentrator body and the induction attachment into a respective plastic injection molding machine together, and molding plastic around it, which forms the retaining ring after hardening.

The retaining ring can be made of a temperature resistant plastic, which can maintain its shape at temperatures above 120° C., and up to 150° C., so that its retaining function remains assured. The production of the retaining ring from heat resistant plastic facilitates that one or plural unshrinking cycles can be performed without a break in between, and thus without the unit comprised of the induction attachment, the concentrator body and the retaining ring failing, with at least the induction attachment heating up enough, so that it thermally damages the plastic of the retaining ring. PI- or PTFE plastics are particularly suitable for the present application.

According to yet another aspect of the present invention, the plastic of the retaining ring can completely or partially reach around the induction attachment, and thus in particular also in the portion of its outer circumference, which the user would certainly touch, when attempting to lift the unit out of the induction attachment, and while attempting to lift the concentrator body and the retaining ring out of the device. This way, the risk is reduced that the user is burned directly at the heated induction attachment, since the user touches the highly heat conductive surface of the induction attachment directly.

The induction attachment can be provided or covered with an interrupted plastic touch protection at least in some sections. The interrupted touch protection is typically a component made of temperature resistant plastic, e.g., a plastic as stated above or also Nylon®, which is provided with a plurality of apertures, thus, which is "interrupted". Through these apertures, cooling air (blown air or convectively flowing air), or the coolant have direct access to the metal surface of the induction attachment, whereby the induction attachment can be effectively cooled in spite of the touch protection. Though tightly spaced, each of the apertures is small enough compared to the bars disposed between the apertures, so that the skin of the user, when touching the induction attachment heated to 80° C. substantially, does not directly contact the metal surface of the induction attachment through the apertures and does not get burned due to the high heat conductivity of the surface. Since it depends on the particular application how large those apertures have to be and how tightly they have to be spaced, many dimensions can be used. A person skilled in the art can determine this for each actual application, considering that the air or coolant access to the metal surface of the induction attachment typically shall be restricted as little as possible, so that the metal surface shall only be covered in as far as it is required for assuring sufficient touch protection. The touch protection can either be provided as an integral component of the retaining ring or as a separate component. The interrupted touch protection can be provided as a type of cage, which is closed at least in sections, which contacts the surface of the induction attachment locally at the most, and whose "grid section" is mostly offset from the surface of the induction attachment. The touch protection can also contact the surface of the induction attachment directly, e.g., like a net or like a grid.

The induction attachment can be configured, so that it has a large heat capacity or mass, so that the end temperature of the induction ring is less than 100° C., or less than 80° C., also after plural shrink cycles, performed in direct sequence, in which a cold tool holder is heated respectively, so that the associated tool can be inserted and removed again. This is decisive, because a substantial amount of heat is generated in the induction attachment through the currents induced therein, which heat cannot be dissipated to the ambient air in its entirety due to the shortness of time. Nevertheless, the induction body must not heat up by an arbitrary amount. This is prevented as described herein.

DETAILED DESCRIPTION OF PREFERRED EMBODIMENT

Figure 1:
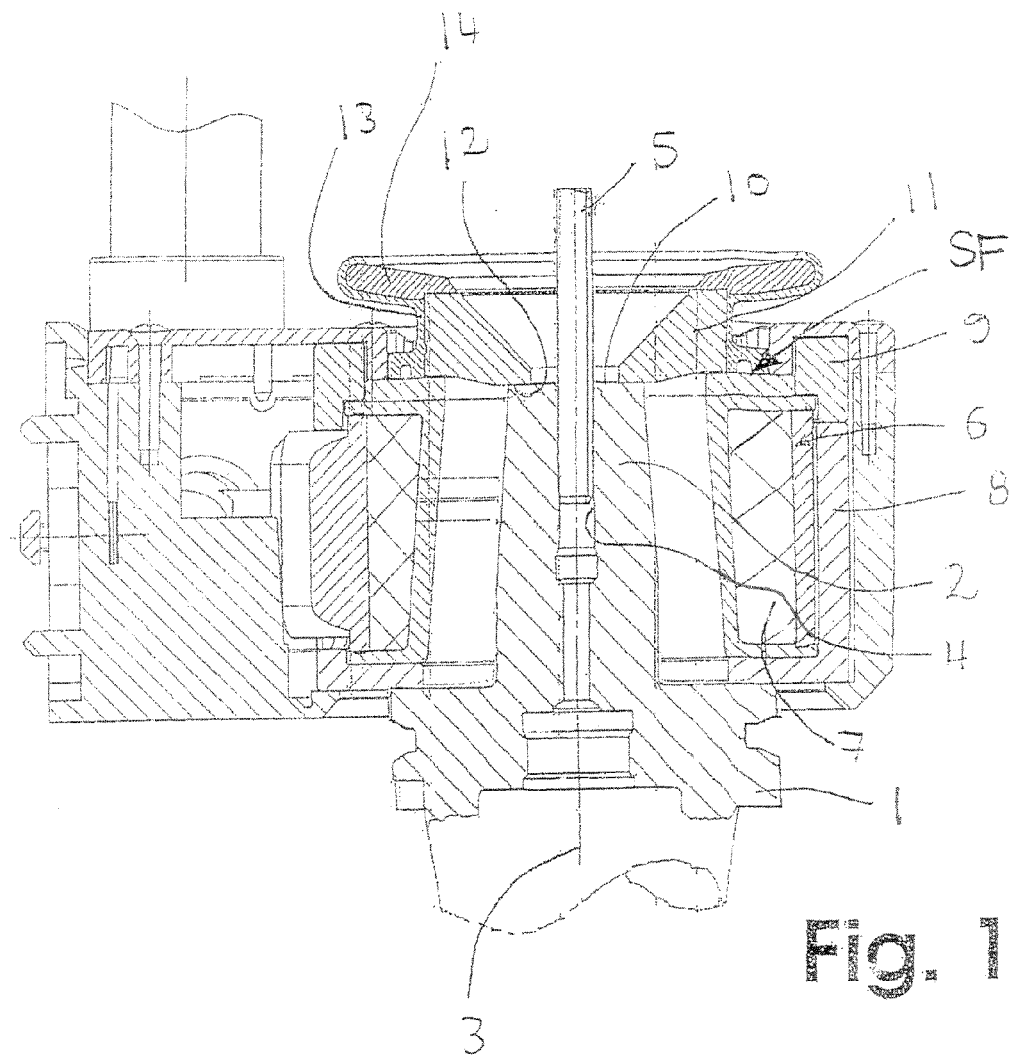
FIG. 1 shows an axial longitudinal sectional view through a device according to the invention for inductively heating a tool holder with a disk shaped pole shoe at the tool side end of the tool holder.

The illustrated embodiment includes a tool holder 1, which it is made of a material which is at least electrically conductive, but also magnetically conductive in this particular application, like, e.g., steel. At its other end, the tool holder comprises a sleeve section 2. The sleeve section 2 includes a receiver opening 4, centrally disposed relative to the rotation axis 3 of the tool holder, which receiver opening 4 is configured to receive a rotating tool, e.g., a drill, a cutter, or also a broaching tool, which is not shown in more detail, which can be inserted into the receiver opening 4 with its shaft 5.

The outer diameter of the shaft 5 is slightly larger than the free nominal diameter of the receiver opening 4, so that the shaft 5 is supported in the sleeve section 2 in a press fit, whereby the necessary torque can be transmitted to the rotation tool. In order to be able to insert the tool shaft 5 into the tool holder 1, or in order to be able to remove it from said tool holder, the sleeve section 2 is expanded by heating. The heating is performed by means of an induction coil 6, which is placed onto the sleeve section 2, and which concentrically envelopes the sleeve section at a radial distance. The induction coil 6 is fed by AC power or by pulsating DC power with a frequency of, e.g., 5 to 20 kHz. The magnetic flux generated by a substantially cylindrical winding 7 induces Eddy currents in the sleeve section 2. The Eddy currents heat the sleeve section 2 in a relatively short period of time, and thus sufficiently expand the receiver opening 4 in order to be able to insert the tool shaft or to pull it out.

The induction coil 6 has a coil body 8 made of temperature resistant plastic or made of ceramics, onto which a multilayer winding 7 is applied. The outer circumference and the face of the winding 7 pointing away from the tool are covered with a one-piece- or multi-piece yoke assembly made of a magnetically conductive- and electrically nonconductive material, which focuses and concentrates the magnetic flux onto the yoke assembly 9 in this surrounding portion of the winding 7.

The winding 7 provided with the yoke assembly 9 substantially extends over the entire length of the receiver opening 4, or of the sleeve section 2 configured for receiving the tool shaft 5.

In order to direct the magnetic flux from the yoke assembly 9, which slightly protrudes beyond the winding 7 on this side in axial direction to the face 10 of the sleeve section 2, in an optimum manner while simultaneously shielding the portion of the tool shaft 5 which protrudes beyond the sleeve section 2, and protecting from inductive heating, a concentrator body 11 is associated with the face SF of the coil, which concentrator body influences the field emanating from the yoke assembly 9. The concentrator body 11 can be configured in the form of a shielding collar. It is also comprised of a magnetically conductive material, which concentrates the magnetic flux, which material, however, is substantially electrically nonconductive. This is the reason why it does not heat up substantially under the influence of the magnetic field.

The concentrator body 11 thus configured extends on all sides at a distance from the yoke assembly 9. The yoke assembly 9 does not extend beyond the tool side face of the winding 7 in the illustrated embodiment, but it only slightly protrudes beyond the face and it can also cover the coil when required. The concentrator body has a flat contact surface 12 extending orthogonal to the axis and axially facing the sleeve section 2, which contact surface contacts the annular face of the sleeve section 2 in a planar manner.

The concentrator body 11 is configured with a retaining ring 13 made of a material which is also resistant against higher temperatures, and which is magnetically and electrically nonconductive, which can be made of plastic. By means of this retaining ring 13, the concentrator body 11 is fixated relative to the induction coil 6, however, so that it can be exchanged with a concentrator body selected from a group of concentrator bodies with slightly different shapes (not shown). The concentrator body 11 this way provides correct axial positioning of the respectively inserted sleeve section 2 of the tool holder relative to the induction coil 6. Furthermore, it can also be exchanged for adapting the same induction coil 6 to the tool holder with different sleeve sections 2.

The annular gap remaining between the yoke assembly 9 and the concentrator body 11 provided here in the shape of a shielding collar increases the resistance in the magnetic loop of the induction coil 6. In spite of that, the concentrator body 11, due to its configuration as a shielding collar facilitates a concentration of the magnetic flux to the sleeve section 2, which is substantially free from scatter fields in the portion of the tool shaft 5. This way, the sleeve section 2 can be inductively heated without causing excessive heating of the tool shaft 5.

According to an aspect of the illustrated invention, the concentrator body 11 bears an induction attachment 14, its outside facing away from the induction coil 6. Different from the concentrator body, the induction attachment is comprised of an electrically well conductive material, which, however, is magnetically nonconductive.

The induction attachment 14 is in direct large surface contact with the concentrator body 11. The induction attachment 14 and the concentrator body 11 touch one another substantially along the entire upper planar surface of the concentrator body. This way, the induction attachment 14 can very quickly transfer a portion of the thermal energy generated in itself to the concentrator body 11 if necessary, which prevents a possible overheating of the induction attachment 14.

Figure 2:
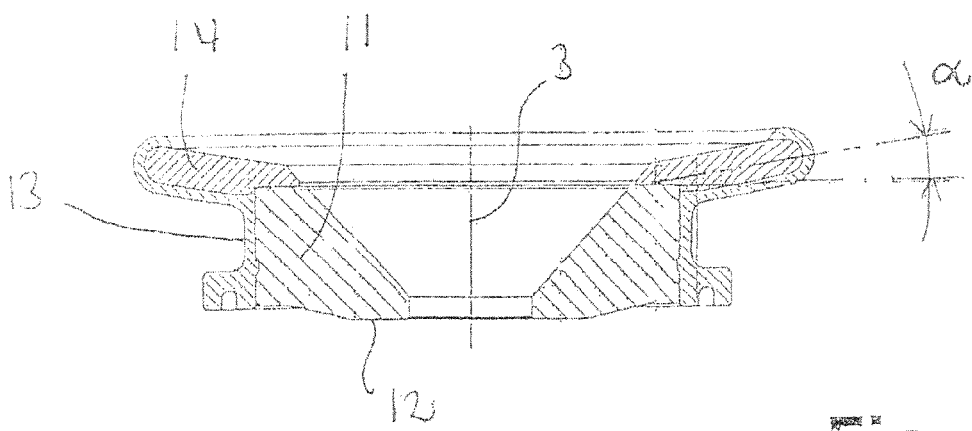
FIG. 2 shows an axial sectional view through the unit comprised of the concentrator body, the induction attachment and the retaining ring.

The induction attachment 14 protrudes outward in radial direction beyond the concentrator body 11. The induction attachment can extends tilted upward, approximately at angle $\alpha$ of 10 to 20 degrees relative to horizontal, as shown in FIGS. 1 and 2. The induction attachment 14 can therefore be described as a circular ring with its outer circumference folded over upward. This way, it forms a collar extending outward beyond the concentrator body 11. The collar forms a type of obstacle, which is fluxed through by a substantial portion of the field lines, which otherwise tend to initially circumvent the concentrator body 11 and tend to enter into the concentrator body 11 initially coming from a portion which is higher than the axis 3.

Therefore, Eddy currents are generated in the induction attachment 14, which Eddy currents naturally form a magnetic field by themselves, a type of opposite field. Thus, the field to be weakened in the exterior of the coil 9 automatically causes an opposite field with weakening effect to emanate from the induction attachment 14.

The induction attachment is thus provided as a copper ring, closed in circumferential direction. The induction attachment could also be configured as an aluminum ring. However, it has become apparent that a configuration as a copper ring provides a much more effective impact in the current application or it leads to much lower heat up of the induction attachment.

The concentrator body 11 and the induction attachment are disposed in the common retaining ring 13, already briefly described above. The retaining ring 13 is comprised of a highly temperature resistant plastic, which is integrally injection molded with the concentrator body 11 and the induction attachment 14. The plastic of the retaining ring 13 reaches about the induction attachment 14 also in the portion of its largest outer diameter, and thus prevents that the user comes into direct contact at this location with the exposed hot- and naturally very heat conductive surface of the induction attachment 14.

Figure 3:
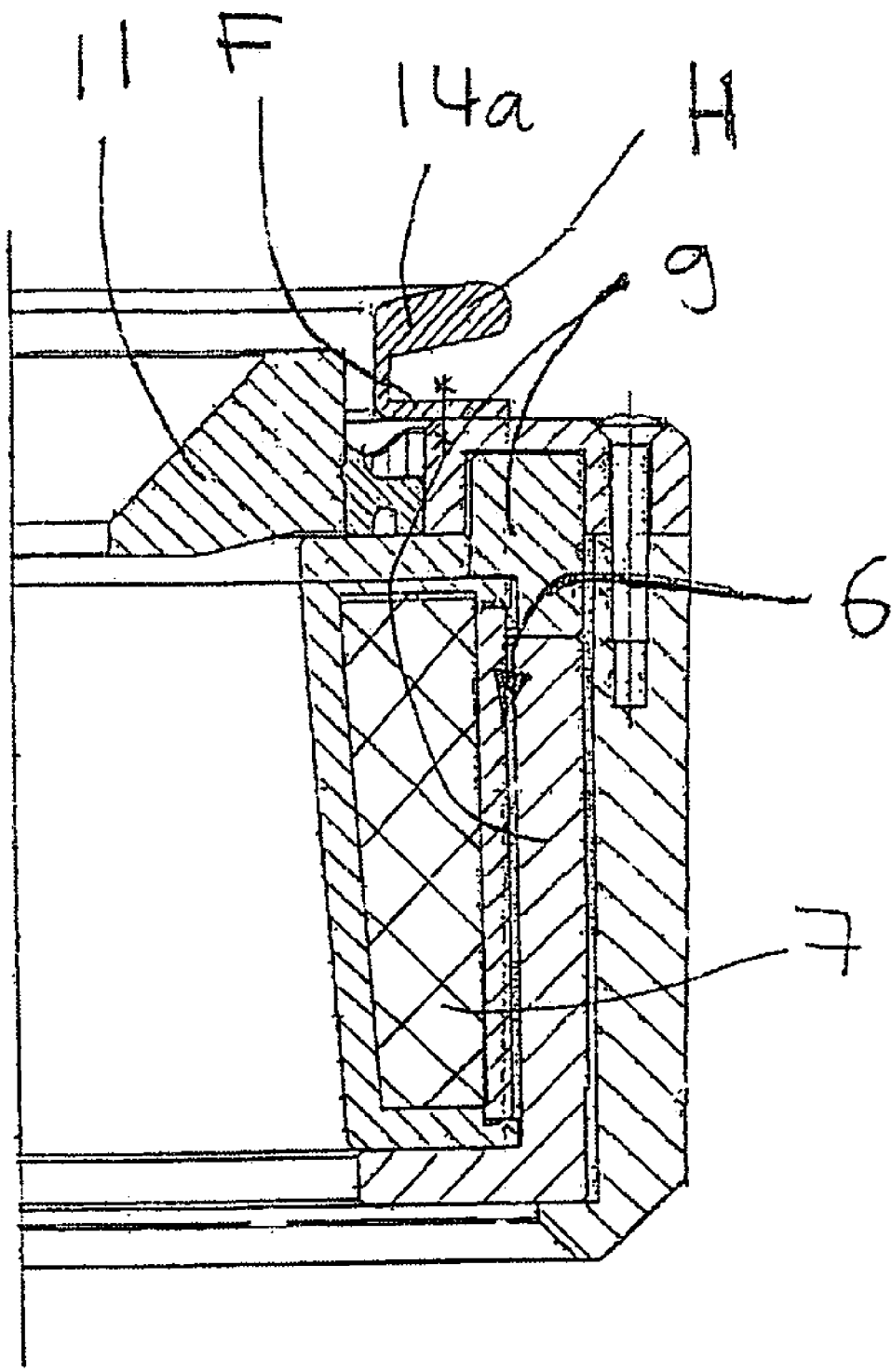
FIG. 3 shows a semi-sectional view through a second alternative embodiment.

FIG. 3 shows a semi-sectional view through another embodiment of the invention.

The embodiment of FIG. 3 differs from the embodiment described above with reference to FIGS. 1 and 2 in that therein, the concentrator body 11 itself is not provided with an induction attachment, but that an induction body 14a, which is also provided in a collar shape in this application, is provided directly at the coil assembly 9, or at the coil housing (in particular, in the portion of the face of the coil 6 oriented towards the end of the sleeve section). Thus, the above statements apply analogously as long as no physical features of the above induction attachment are addressed, which are not shown in FIG. 3.

The functional principle of the induction body 14a is the same as described above for the induction body described in the form of the induction attachment 14. The induction body 14a is fluxed by the field of the coil 6, which induces a current therein. The current generates an opposite field, which partially weakens or directs the main field, so that an active shielding occurs also here.

It is appreciated that a base section F, which supports a collar shaped main section H of the induction body 14a, is preferably not comprised of the same electrically conductive and magnetically nonconductive material as the collar type main section H, but which is preferably made of a plastic material. Thus, the thermal load on the induction body is substantially reduced compared with the case where the base section F is made of electrically conductive material.

Attaching or retaining the induction body independently from the concentrator body has significant practical relevance, in particular for systems with adjustable coils and/or adjustable concentrator bodies, which do not have to be replaced, in order to reconfigure the system for shrinking various sleeve diameters.

Furthermore, it is appreciated that active shielding elements with comparable effect can also be mounted at the circumference of the coil, e.g., in order to shield the actuation button of the coil.

In closing, it is appreciated that induction attachments as described above certainly do not only work in conjunction with concentrator bodies, configured as shielding collars.

The invention claimed is:

1. A device for clamping and unclamping of tools including a tool shaft comprising:
    a tool holder having a sleeve section comprising a center receiver opening for receiving the tool shaft, the sleeve section being configured to be inductively heated, the sleeve section being configured to retain the tool shaft seated in the receiver opening in a press fit and being configured to release the tool shaft upon heating of the sleeve section; and
    an induction coil assembly with at least one induction coil, the induction coil assembly being configured to be fed by an electric current for heating the sleeve section, the induction coil assembly includes a concentrator body which is magnetically conductive and electrically nonconductive or substantially electrically nonconductive, wherein the concentrator body concentrates a magnetic flux of the at least one induction coil onto a portion of a tool side end of the sleeve section, and wherein the concentrator body supports an induction attachment made of electrically conductive material and magnetically nonconductive material, the induction attachment being positioned on an outer end surface of the concentrator body and extending axially and radially from the concentrator body, the induction attachment being spaced by the concentrator body from the sleeve section so that the induction attachment reduces or eliminates a scatter field in a direction where an operator using the tool holder is located when changing tools, and including a retainer holding the induction attachment on the concentrator body.

2. The device according to claim 1, wherein:
    the induction attachment is disposed relative to the concentrator body so that the concentrator body is fluxed by a portion of a field extending outside of the concentrator body so that a current is induced in the induction attachment; and
    the induction attachment is positioned and configured so that an opposite field is generated by the current induced therein, the opposite field superimposing a magnetic field of the at least one induction coil so that overall at least a local reduction of the magnetic field of the at least one induction coil, which fluxes an exterior of the device, occurs.

3. The device according to claim 1, wherein:
    the induction attachment comprises an electrically closed ring.

4. The device according to claim 3, wherein:
    a bottom face of the ring is tilted upward relative to a top face of the sleeve section.

5. The device according to claim 4, wherein:
    the bottom face is tilted at an angle of 10 to 14 degrees.

6. The device according to claim 1, wherein:
    the induction attachment is made from copper.

7. The device according to claim 1, wherein:
    the induction attachment comprises a folded over ring.

8. The device according to claim 1, wherein:
    the retainer includes a retaining ring that surrounds the concentrator body and that simultaneously also maintains and at least partially protects the induction attachment on the concentrator body.

9. The device according to claim 8, wherein:
    the concentrator body and the induction attachment are in direct surface contact with one another.

10. The device according to claim 9, wherein:
    the retaining ring is a plastic ring formed by joint injection molding about the concentrator body and about the induction attachment.

11. The device according to claim 10, wherein:
    the plastic of the retaining ring partially or entirely reaches around the induction attachment, so that plastic reduces a risk that a user is burned by the induction attachment when the induction attachment is heated.

12. The device according to claim 1, further including:
    a yoke assembly made of magnetizable, electrically nonconductive or electrically nonconductive material, wherein the yoke assembly in combination with the sleeve section forms a closed magnetic loop about the at least one induction coil; and
    an induction body made of electrically conductive material associated with the closed magnetic loop.

13. The device according to claim 12, wherein:
    the induction body is disposed in a portion of a face of the at least one induction coil oriented towards an end of the sleeve section.

14. The device according to claim 12, wherein:
    the induction body is positioned so that a current induced therein generates an opposite field, which superimposes a magnetic field of the coil, so that overall at least a local reduction of the magnetic field of the coil is provided, which magnetic field fluxes an exterior of the device.

15. A device for clamping and unclamping of tools including a tool shaft and a tool holder having a sleeve section with a center receiver opening for receiving the tool shaft, the sleeve section being configured to be inductively heated, the sleeve section being configured to retain the tool shaft seated in the receiver opening in a press fit and being configured to release the tool shaft upon heating of the sleeve section, the device comprising:
    an induction coil assembly with at least one induction coil, the induction coil assembly being configured to be fed by an electric current for heating the sleeve section, the induction coil assembly includes a concentrator body which is magnetically conductive and electrically nonconductive or electrically nonconductive, wherein the concentrator body is for concentrating a magnetic flux of the at least one induction coil onto a portion of a tool side end of the sleeve section, and wherein the concentrator body supports an induction attachment made of electrically conductive material and magnetically nonconductive material, the induction attachment being positioned on an outer end surface of the concentrator body and extending axially and radially from the concentrator body, the induction attachment being spaced by the concentrator body from the sleeve section so that the induction attachment reduces or eliminates a scatter field in a direction where an operator using the tool holder is located when changing tools, and including a retainer holding the induction attachment on the concentrator body.

* * * * *